United States Patent [19]
Mohan

[11] 4,224,660
[45] Sep. 23, 1980

[54] COMPOSITE FILTER FOR SUPPRESSING HARMONIC FREQUENCIES ON ELECTRIC POWER TRANSMISSION LINES

[75] Inventor: Narendra Mohan, Minneapolis, Minn.

[73] Assignee: The Regents of the University of Minnesota, Minneapolis, Minn.

[21] Appl. No.: 5,318

[22] Filed: Jan. 22, 1979

[51] Int. Cl.$^2$ .............................................. H02M 1/12
[52] U.S. Cl. ...................................... 363/48; 363/35; 333/176
[58] Field of Search .................................. 363/35–37, 363/44–48; 307/105; 333/175–176

[56] References Cited
U.S. PATENT DOCUMENTS

| | | | |
|---|---|---|---|
| 3,825,814 | 7/1974 | Pelly | 363/45 X |
| 3,883,792 | 5/1975 | Ellert | 363/35 X |
| 3,935,551 | 1/1976 | Henninger et al. | 333/176 |
| 4,053,820 | 10/1977 | Peterson et al. | 363/44 |
| 4,079,305 | 3/1978 | Peterson et al. | 363/27 |

Primary Examiner—Harry E. Moose, Jr.
Assistant Examiner—Peter S. Wong
Attorney, Agent, or Firm—Peterson, Palmatier, Sturm & Sjoquist, Ltd.

[57] ABSTRACT

AC to DC converters used in high-voltage direct-current power transmission lines produce objectionable harmonics. The composite filter herein described is actively tuned for the eleventh and thirteenth harmonics in addition to providing a low impedance path for the higher order harmonics, thereby eliminating such undesired harmonics so that they will not be transmitted over power lines where they can cause telephone interference, undesired heating of electrical equipment and other difficulties.

8 Claims, 3 Drawing Figures

COMPOSITE FILTER FOR SUPPRESSING HARMONIC FREQUENCIES ON ELECTRIC POWER TRANSMISSION LINES

BACKGROUND OF THE INVENTION

This invention relates generally to high-voltage direct-current (HVDC) power transmission lines or systems, and pertains more particularly to composite filters for eliminating from the transmission system that harmonics that are produced by the converters utilized in changing the alternating current power to direct current power. High reliability of thyristor valves has allowed the adoption of 12-pulse conversion. Consequently, the characteristic harmonics are of the order $12n \pm 1$ where n is a positive integer. The uncharacteristic harmonics associated with a balanced operation are quite small in magnitude. In view of the accelerating interest in HVDC power links, the requirement demanding proper filtering is expected to increase. The harmonics, if not properly filtered, can cause telephone interference, heating of electrical equipment and a ripple control malfunction.

DESCRIPTION OF THE PRIOR ART

Conventionally, for filtering the harmonics injected by an AC to DC converter into an AC power transmission system, a set of series-tuned filters are provided for the eleventh and thirteenth order harmonics, where the fundamental frequency is 60 Hz, and a high pass filter is provided for the higher order harmonics. Discrete filters of the foregoing character have a number of drawbacks;

(1) Such filters are detuned whenever the system frequency deviates from its normal value or if the filter parameters change with temperature, (2) The filter performance partially depends on the AC system harmonic impedance which is usually not known and varies with the system configuration or design, (3) The tuned filters act as a sink to the so-called ambient harmonics generated elsewhere on the AC system, and (4) Due to the discrete filter branches employed, a large land area is required in order to insure proper air clearances between the individual filter branches.

U.S. Pat. No. 4,053,820 issued on Oct. 11, 1977, and in which I am a co-inventor, depicts actively-tuned filters for the eleventh and thirteenth harmonics and the filters shown in said patent satisfactorily overcome most of the shortcomings mentioned above. More specifically, the drawbacks designated as (1), (2) and (3) are generally overcome quite satisfactorily. However, the actively-tuned filter arrangement depicted in said patent has the same drawback as the discrete filter arrangement as far as shortcoming (4) is concerned in that a considerable amount of land area is needed in order to afford the proper air clearances between the individual filter branches. In addition, all of the harmonic current injected by the AC/DC converter in the system described in said patent has to be cancelled by the active filter with the consequence that the active portion of the filtering equipment must carry a considerably larger current rating. Moreover, under transient conditions, a considerable amount of voltage appears across the active portion of the filtering equipment, thereby requiring a higher voltage rating.

Usually a set of tuned eleventh and thirteenth harmonic filters are used for the two lower order harmonics and a high pass filter is used for the remainder or higher order harmonics. In power systems, each element, however, has an associated overhead cost in terms of protection and switching. Moreover, much of the land area required for the filters is used for air clearances between individual branches. The land area becomes an important factor where compact DC terminals are involved, such as in thickly settled metropolitan communities. Therefore, there is a compelling motivation to reduce the number of elements and filter branches without compromising the system reliability and particularly the filter performance.

SUMMARY OF THE INVENTION

Accordingly, a general object of the present invention is to provide a filtering action that is at least as satisfactory as in the prior art known to me and which will in addition be less costly and take up less space.

A more specific object of the invention is to provide a filter arrangement that will be compact, particularly with respect to allowing individual filter branches to be positioned quite close together so that a large land area is not required.

Another object of the invention is to reduce the number of components that must be subject to relatively high voltage.

A further object of the invention is to keep the voltage and current ratings of the active current injection sources small in order to minimize costs.

Yet another object is to provide a filter system for transmission lines that is exceptionally reliable. Even though the reliability of my filter arrangement is outstanding, problems with one of the active current injection sources can occur. Nonetheless, my composite filter may under such adverse circumstances be operated for a limited time with the DC power transmission maintained at its rated value.

Briefly, my invention provides a composite filter composed of two filter sections or networks which are connected in series and the two of which provide series resonance at the eleventh and thirteenth harmonic frequencies, yet also affording a low impedance to higher harmonics. Injection of a very small current at the eleventh and thirteenth harmonic frequencies at a point or junction between the two filter sections enables complete filtration to be readily achieved for normally expected changes or variations in frequency.

DESCRIPTION OF THE PREFERRED EMBODIMENT

Figure 1:
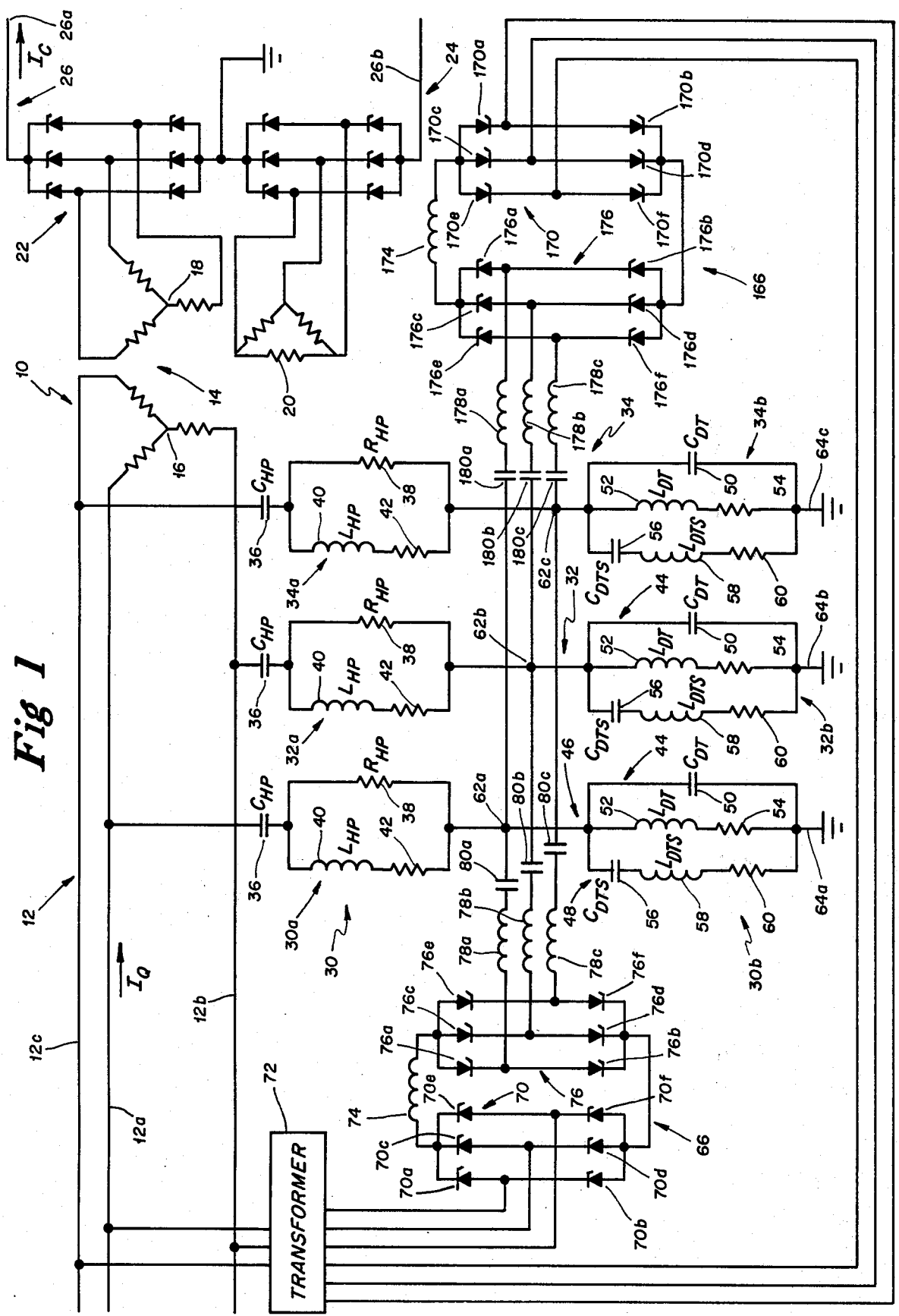
FIG. 1 is a schematic representation of a power transmission system utilizing my invention therein.

Referring now in detail to FIG. 1, it will be recognized that this figure depicts an AC to DC conversion power transmission system 10. More specifically, the AC portion or segment of the system has been indicated generally by the reference numeral 12. Inasmuch as the AC portion 12 is a three-phase one, each power line thereof has been indicated by the reference numerals 12a, 12b and 12c.

As far as the conversion system itself is concerned, this has been generally designated by the reference numeral 14 and conventionally can include a star-delta configuration of transformer windings labeled 16, 18 and 20. The winding 18 is connected to one Graetz bridge converter 22 and the winding 20 to a second Graetz bridge converter 24, the two converters 22, 24 providing 12-pulse conversion. To complete the description of the power system 10 that is exemplified in FIG. 1, the DC portion or segment thereof has been indicated by the reference numeral 26a and 26b.

Inasmuch as the AC portion 12 of the power system 10 is typically a three-phase one, three composite filters 30, 32 and 34 constructed in accordance with the teachings of my invention are employed. Inasmuch as each composite filter 30, 32 and 34 is a replica of the other, only one such filter need be described in detail. Therefore, the composite filter 30 includes what will be termed two filter sections or networks which have been denoted by the reference numerals 30a and 30b respectively. The sections of the composite filters 32 and 34 have been similarly designated as 32a, 32b and 34a, 34b, respectively.

Referring to the filter sections or networks 30a, 32a and 34a, it will be discerned that each is composed of a capacitor 36 having a capacitance $C_{HP}$, a resistor 38 have a resistance $R_{HP}$, the resistor 38 being connected in parallel with an inductor 40 having an inductance $L_{HP}$. For the sake of completeness, it will be appreciated that the inductor 40 has some resistance associated therewith and therefore in FIG. 1, the resistance, which is actually a part of the inductor, has been indicated by the reference numeral 42.

The second filter sections or networks, which have been given reference numerals 30b, 32b and 34b, are composed of three impedance legs 44, 46 and 48. The first leg 44 contains therein a capacitor 50 having a capacitance $C_{DT}$. The central leg 46 contains therein an inductor 52 having the inductance labeled $L_{DT}$. Here again, the inductor has some resistance associated therewith and the resistance of the inductor 52 has been indicated by the reference numeral 54. the third leg 48 contains therein a capacitor 56 having the capacitance $C_{DTS}$ which is in series with an inductor 58 having the inductance $L_{DTS}$. Once again, the inductor 58 contains therein some resistance and this resistance has been labeled 60.

Depending upon the cost of various components, it is possible to optimize the overall cost of the composite filters 30, 32 and 34 by eliminating the impedance leg 48, more specifically the capacitor 56 and the inductor 58 (along with the resistance 60 which is, of course, inherent in the inductor 58). More will be said hereinafter concerning this possibility. It should be perceived, though, that the three legs 44, 46 and 48 containing the capacitors 50, 56 and the inductors 52, 58 are arranged in parallel with each other. It is important to recognize that the two filter sections or networks 30a and 30b (as well as the sections 32a, 32b and 34a, 34b of the composite filters 32 and 34, respectively) are connected in series with each other, the junctions thereof being labeled 62a, 62b, 62c.

At this stage of the description, it can be explained that the capacitor 36, the resistor 38, and the inductor 40 of the filter section or network 30a constitute a high pass filter which passes eleventh harmonic frequencies and all frequencies thereabove, including of course the thirteenth harmonic.

The capacitor 50 and the inductor 52, as well as the capacitor 56 and the inductor 58 when the leg 48 is included, of the other filter section or network 30b are selected so that in combination with the capacitor 36, the resistor 38 and the inductor 40 of filter section or network 30a provides a series-resonance, that is, as little impedance as possible, at both the eleventh and thirteenth harmonic frequencies. It is important to appreciate that it is the total or concerted value of the two networks 30a and 30b that is chosen so that the branch constituting the entire filter 30 is series-resonant at the objectionable eleventh and thirteenth harmonic frequencies. In this way, any currents having the eleventh and thirteen harmonic frequencies, and those of any higher orders, will simply be passed from the line 12a to ground via a line 64a. The same, quite obviously, holds true for the composite filters 32 and 34, these filters being connected to ground via lines 64b and 64c, respectively. It is the total or combined value of impedance for each composite filter that provides the series resonance at the eleventh and thirteenth harmonics.

Up to this point, the two filter sections 30a and 30b of the filter 30 (and the sections 32a, 32b and 34a, 34b of the filters 32 and 34) are solely of a passive character. Therefore, without more, any change in temperature or frequency would upset the series-tuned character of the two filter sections or networks. Also, any change in the fundamental frequency would also destroy the resonant condition that is vital as far as my invention is concerned in ridding the system 10 (and particularly the DC portion or segment 26) of the objectionable harmonics. Moreover, the series resonance at the eleventh and the thirteenth harmonics will not yield as low an impedance as is desirable, or as can be obtained, from two discrete branches with one tuned for the eleventh harmonic and the other tuned for the thirteenth. This is the way it is done in existing prior art installations where a separate series-tuned filter is employed for each of the two harmonics, along with a high pass filter in parallel therewith.

With the above in mind, my invention contemplates the injection of small currents into each composite filter 30, 32 and 34 at the junctions 62a, 62b and 62c, although the filters 30, 32 and 34 could be operated, especially for short periods of time, with full rated power on the DC portion 26 without current injection. It should be noted, though, that the composite filter 30 (or 32 or 34) with no current injection has slightly higher impedance around the eleventh and thirteenth harmonic frequencies than in the case of discrete filters when such prior art filters are passively tuned to the eleventh and thirteenth harmonics. Thus, it is important in the practicing of my invention to inject the proper amount of current for the eleventh and thirteenth harmonic frequencies in order to achieve a desirable amount of filtering at these two frequencies.

Accordingly, two harmonic current sources 66 and 166 have been shown in FIG. 1. Inasmuch as these harmonic current sources are described in considerable detail in the aforesaid U.S. Pat. No. 4,053,820, only a brief description thereof will be given at this time.

Referring to the current source 66, which is for the eleventh harmonic, it will be noted that it constitutes a Graetz type converter which includes an SCR or thyristor rectifier bridge 70. More specifically, the bridge 70 is composed of individual SCR's labeled 70a, 70b, 70c, 70d, 70e and 70f. The bridge 70 receives AC power from the AC portion 12 of the transmission system 10 and converts the AC current to DC current, being connected to the power lines 12a, 12b and 12c via a stepdown transformer denoted generally by the block 72. It can be pointed out that the transformer 72 is usually already available at HVDC terminals or substations, being used to furnish power to lighting, cooling, instrumentation and like loads. The gates of the various SCR's are connected by lines to an adjustable firing angle controller (not shown) but which is best understood from U.S. Pat. No. 4,079,305, issued Mar. 14, 1978, and in which I am also a co-inventor. It will be appreciated, though, that the controller fires the various SCR's so as to vary the magnitude of the injected current, as more fully explained in said U.S. Pat. No. 4,079,305 and also in previously referred to U.S. Pat. No. 4,053,820.

An inductor 74 is connected between the rectifying bridge 70 and a harmonic inverter bridge 76 which functions to provide a relatively smooth DC current supply to the inverter. As far as the bridge 76 is concerned, it is also composed of a number of SCR's or thyristors, the SCR's in this instance being designated by the reference numerals 76a, 76b, 76c, 76d, 76e and 76f. As more clearly explained in U.S. Pat. No. 4,079,305, an inverter firing angle controller (not herein shown) is employed, being connected to the respective gates of the SCR's 76a, 76b, 76c, 76d, 76e and 76f. The control circuit for the bridge 76 is also dealt with in said U.S. Pat. No. 4,053,820.

It can be pointed out at this time that the bridge 76 is connected through inductors 78a, 78b, 78c and commutating capacitors 80a, 80b, 80c to the previously mentioned junctions 62a, 62b and 62c, there being one such junction for each composite filter 30, 32 and 34. Variation of the conduction of the SCR's 76a, 76b, 76c, 76d, 76e and 76f contained in the bridge 76 will cause the frequency and phase of the injected harmonic currents to be varied, all as explained in U.S. Pat. Nos. 4,079,305 and 4,053,820.

Whereas the source 66 produces injected currents for the eleventh harmonic, the source 166 injects current in the same manner for the thirteenth harmonic. While different magnitudes, phase relationships, phase sequence and frequencies are involved, thereby requiring different control signals, as can be appreciated from U.S. Pat. Nos. 4,053,820 and 4,079,305, the same basic components are employed as far as FIG. 1 is concerned; therefore, such components are similarly identified, having a prefix "1" preceding each numeral and being energized from either another transformer corresponding to the transformer 72 and hence isolated from the transformer 72, or, as suggested in FIG. 1, from a separate secondary belonging to the transformer 72.

The possibility of achieving a component cost saving by eliminating the leg 48 from each filter section 30b, 32b and 34b has earlier herein been alluded to. However, the omission of leg 48 would result in a slightly higher rating of the current injection source 66 (and also the source 166) due to the shift away from a more precise series-resonance condition. Nonetheless, the increase in cost for the sources 66 and 166 may very well be offset by the reduction in cost of the filter sections 30b, 32b and 34b realized by the elimination of the leg 48 from each of these sections 30b, 32b, 34b.

Figure 2:
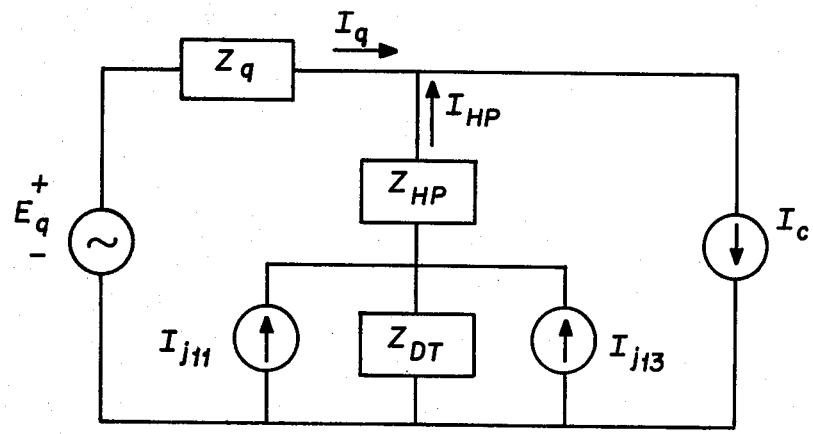
FIG. 2 depicts a single phase equivalent circuit for one of the composite filters of FIG. 1.

Referring to FIG. 2, which depicts a single phase equivalent circuit of the composite filter 30 (or 32, 34) it will be observed that a circular block represents the Thevenin voltage source $E_q$ which is assumed to be of fundamental frequency only, that is, $E_q = E^1_q$. A rectangular block represents the equivalent impedance $Z_q$ which is the Thevenin impedance looking into the total AC portion or segment 12 of the system 10 from the composite filter terminals, that is between power line 12a and ground 64; it does not, however, include the impedance of the composite filter 30.

For the sake of completeness, although Thevenin's theorem is fairly well known, it can be explained that it, basically speaking, states that a network consisting of any number of sources and any number of branches may be analyzed by considering the network to be replaced by a simple circuit consisting of a single voltage source and a single impedance in series connection.

Continuing with the description of FIG. 2, the previously mentioned 12-pulse converter 22, this being the converter that without appropriate filtration introduces the harmonics into the AC portion 12 of the power system 10, produces the AC current represented as $I_c$. During the balance or steady state operation, the AC current $I_c$ equals $I^1_C + \epsilon I^h_C$, where the superscript h denotes the frequency as a multiple of the system frequency $f_s$, and $h = 12n \pm 1$ where, n = a positive integer.

Still further, another block denotes the high pass impedance of the filter section or network 30a, being represented as $Z_{HP}$. Still further, the impedance of the second filter or network 30b has been denoted by still another block in FIG. 2, the impedance of this network being indicated as $Z_{DT}$.

The two sources of injected current, which have previously been identified by the reference numerals 66 and 166 provide injected currents represented by $I_{j11}$ and $I_{j13}$, respectively.

Figure 3:
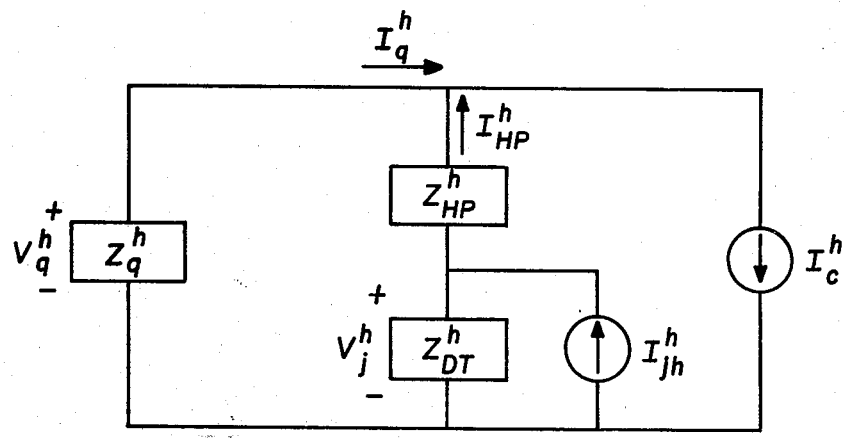
FIG. 3 is a single phase equivalent circuit for a composite filter at h harmonic frequency.

Generalizing somewhat over FIG. 2, reference will now be made to FIG. 3 which is a single phase equivalent circuit corresponding to FIG. 2 but at h harmonic frequency where the superscript h, as before, denotes generically the values that either the eleventh or thirteenth harmonic frequencies may assume. Therefore, as far as FIG. 3 is concerned, it will be appreciated that in order to achieve complete filtering, $I_q h$ and therefore $V^h_q$ should be zero. This can be obtained if $I_{HP}^h = I^h_C$, thereby requiring the injected current to be $$I^h_{jh} = [\frac{Z^h_{HP} + Z^h_{DT}}{Z^h_{DT}}] I^h_C \quad (1)$$

and, $$V^h_j = Z_{HP}^h I_C^h \quad (2)$$

It is important to bear in mind that the total branch or composite filter 30 composed of the filter sections or networks 30a and 30b is series-tuned at h harmonic frequency. The same holds true, too, for the filters 32 and 34. Therefore, the expression $(Z_{HP}^h + Z_{DT}^h)$ is very small and hence the injected current $I_{jh}^h$ is a small fraction of $I_C^h$. In FIG. 3, $V_j^h$ is the voltage which appears across either current injection source 66 or 166. Actually, since FIG. 3 is a generalization of FIG. 2, each reference character of FIG. 2 which finds correspondence in FIG. 3 has simply had added thereafter the superscript h.

Although the details of the converter control are covered in U.S. Pat. No. 4,053,820, it can be explained that the harmonic rectifiers 70 and 170 are supplied from the 60 Hz AC voltage system 12 via a transformer, such as the generally mentioned transformer 72, whereas the capacitor-commutated inverters 76 and 176 yield three-phase currents at eleventh and thirteenth harmonic frequencies, respectively. The magnitude error $\epsilon m = |I_C{}^h| - |I_{HP}{}^h|$ controls the harmonic rectifier 70 or 170, as the case may be, which in turn controls the magnitude of $I_{jh}{}^h$, consequently driving $\epsilon mh$ to zero. The phase error $\epsilon\theta$ between the phases of $I_C{}^h$ and $I_{HP}$ controls the harmonic inverter 76 or 176, thereby adjusting the phase of $I_{jh}{}^h$ to reduce $\epsilon\theta$ to zero.

Having earlier herein mentioned that transient conditions occurring with prior art filtering equipment, more specifically, that described in U.S. Pat. No. 4,053,820, it will be well to point out that due to the reliance on two filter sections in series with one of such prior art sections being parallel-tuned to either the eleventh or thirteenth harmonic, the parallel-tuned section has a very high impedance to the harmonic frequency for which it is tuned. Consequently, whenever there is a sudden change in the current requirement or load on the 12-pulse converter corresponding to the converter 22, the prior art current injection source cannot change the injection current instantaneously with the result that for a short time interval the difference or error between the current actually being injected and the required current will flow through the AC portion of the transmission system. Due to the high impedance of the prior art filter section now being referred to, high voltages develop because all of the harmonic current from the converter is being cancelled. The large impedance with the large current flowing therethrough creates the objectionable high voltage condition. Since the prior art current injection source is in parallel with the parallel-tuned filter section now being discussed, it follows that this filter section is also subjected to the high voltage. In contrast, the present invention makes use of two filter sections 30a and 30b (as well as 32a, 32b and 34a, 34b) which collectively are series-resonant at the harmonic frequency. Because of the much smaller current being injected by the source 66 (or 166), a much lower voltage appears across the source 66 (as well as source 166).

It should perhaps be explained that the system frequency $f_s$ has been assumed to vary in the range of 59 to 61 Hz. This same frequency variation range proves practical also regarding change in filter components due to temperature and other variables. Therefore, my invention provides a composite filter that effectively filters all objectionable harmonics, a filter that is economical to construct and operate, and a filter that meets relatively stringent space saving requirements.

I claim:

1. A composite filter for suppressing harmonics produced by a converter in an AC to DC power line transmission system comprising first and second filter sections, said first section passing current having a given harmonic frequency and also passing current having harmonic frequencies thereabove which are multiples of the system frequency, means connecting said first and second sections in series between one line of the AC portion of said power system and a second line thereof, said serially connected first and second filter sections together being substantially series-resonant at said given harmonic frequency, and means connected to the junction of said first and second filter sections for injecting current into said filter sections at said junction which injected current is sufficient to cause substantially complete filtration at said given harmonic frequency.

2. A composite filter in accordance with claim 1 in which said given harmonic frequency is the eleventh or thirteenth harmonic frequency of said transmission system frequency.

3. A composite filter in accordance with claim 1 in which said serially connected first and second filter sections are collectively resonant at said given harmonic frequency and another harmonic frequency thereabove, and additional means connected to the junction of said first and second networks for injecting a second current into said filter sections at said junction which second injected current is sufficient to cause substantially complete filtration of said another harmonic frequency.

4. A composite filter in accordance with claim 3 in which said given harmonic frequency is the eleventh harmonic frequency and said another harmonic frequency is the thirteenth harmonic frequency.

5. A composite filter for suppressing harmonics produced by a converter in an AC to DC power line transmission system comprising first and second filter sections, said first section including a capacitor, resistor and inductor, said resistor and inductor being in parallel with each other and in series with said capacitor for passing current through said filter section having a given harmonic frequency and also passing current having harmonic frequencies thereabove which are multiples of the system frequency, said second filter section including a capacitor and inductor in parallel with each other, means connecting said first and second sections in series between one line of the AC portion of said power system and a second line thereof, said capacitor and inductor of said second filter section having component values for causing said serially connected first and second filter sections to be substantially series-resonant at said given harmonic frequency, and means connected to the junction of said first and second filter sections for injecting a relatively small current into said filter sections at said junction which injected current is only sufficient to cause substantially complete filtration at said harmonic frequency.

6. A composite filter in accordance with claim 5 in which said second filter section additionally includes a second capacitor and a second inductor connected in series with each other and in parallel with said first capacitor and inductor of said second filter section, said first and second capacitors, said first and second inductors collectively having component values such as to provide a more precise series-resonant condition at said given harmonic frequency.

7. A method of suppressing harmonics in an AC to DC power line transmission including therein at least two power lines, one of which may be ground, comprising the steps of providing a first filter section containing components capable of passing current having frequencies above a given harmonic frequency, connecting a second filter section in series with said first filter section between said two power lines, said second filter section containing components capable of providing a combined series-resonant condition of said first and second filter sections, and injecting current in said first and second filter sections at a location between said first and second filter sections which is sufficient to cause substantially complete filtration at said given harmonic frequency.

8. A method in accordance with claim 7 in which said first filter section includes a capacitor, resistor and inductor, said resistor and inductor being in parallel with each other and in series with said capacitor, and said second filter section includes a capacitor and inductor in parallel with each other, the component values of the capacitor and inductor of said filter section being selected so as to provide in combination with the values of the capacitor, resistor and inductor of said first filter section said substantially series-resonant condition at said given harmonic frequency.

* * * * *